UNITED STATES PATENT OFFICE.

HARRY M. BLINN, OF BALTIMORE, MARYLAND.

BAKING PREPARATION.

1,370,272.     Specification of Letters Patent.     Patented Mar. 1, 1921.

No Drawing.     Application filed August 21, 1919. Serial No. 318,952.

*To all whom it may concern:*

Be it known that I, HARRY M. BLINN, a citizen of the United States of America, residing in the city of Baltimore, State of Maryland, have invented certain new and useful Improvements in Baking Preparations, of which the following is a specification.

This invention relates to a flour or baking preparation containing shortening and baking powder or equivalent ingredients, and to the method or process for making such a baking preparation. The product may include the elements essential to a sweet cake or some of these may be omitted so that it can be utilized in making biscuits, pastry, muffins, waffles, and the like. The object is to produce such a flour in the form of a dry mixture so composed and combined that it resists the tendency to deterioration to the highest degree, and when inclosed in ordinary paper packages, keeps indefinitely under normal temperatures and atmospheric conditions, being available at any time for the making of cake, biscuits, pastry, muffins or waffles, depending, of course, upon its make-up and the manner of treating, by merely mixing with water to the desired consistency, and baking.

In order that the finished product may have the requisite keeping properties, the materials are thoroughly dried or desiccated. The preferred cake mixture includes wheat flour, corn starch, powdered sugar, shortening fat, powdered egg yolk, albumen, powdered milk, baking powder, salt, coloring matter and flavoring. Some of these, may be omitted and the materials varied in selection and proportion, in accordance with the knowledge of this art common to all bakers and manufacturers of prepared flour, to suit the purpose of the product whether it is to make sweet cake or biscuits or pastry.

The product, mixed in accordance with the process to be described, is a dry powdery material which may have a slightly greasy and sticky appearance. Upon mixing with this material the necessary quantity of water, and beating and stirring, a batter or dough is obtained which can be baked immediately, and which gives a satisfactory cake or biscuit of good flavor, texture and high food value.

The desiccated materials used are, in this condition, highly hygroscopic, and if even slightly exposed to the air under ordinary circumstances will absorb moisture rapidly. These materials are protected by saturating or impregnating them with a shortening. Shortening compounds as ordinarily used are subject to chemical change in contact with the air; to minimize this effect, I use a fat of vegetable or animal origin which has been modified by hydrogenation, removing to a great extent the easily affected constituents, causing it to offer increased resistance to the tendency to become rancid, so that it resists rancidification to a greater degree than do the more perishable materials used, particularly powdered milk and powdered egg. The fat used has a melting point conveniently above 85° and preferably about 110° Fahrenheit, *i. e.* above normal summer temperature.

The baking powder ingredients also tend to absorb moisture, the presence of which would result in the partial solution of the ingredients with consequent interaction or reaction between the acid and sodium bicarbonate, or whatever ingredients are used in the baking powder, giving a loss of carbonic acid gas with a proportionate loss of raising quality of the baking powder and flour. Aside from this, the baking powder has a powerful effect on the shortening and vice versa, tending to produce rancidity.

This is prevented, almost if not quite completely, by surrounding or coating the particles of the different ingredients of the baking powder with a solid, or substantially solid material. For this purpose I prefer a fat or other material of hard wax-like nature which will not be dissolved and dissipated by the fat or oil used as a shortening in the mixture, and already referred to as used to impregnate the desiccated ingredients. Preferably the baking powder constituents, which may be crystals of acid and sodium bicarbonate, are separately coated by mixing with a melted hard fat and then the two ingredients are thoroughly mixed in a suitable machine.

In mixing the ingredients of the baking mixture, any suitable mixing machine may be used. Sugar is first introduced, then salt, powdered egg and powdered milk, then allowing this to be properly mixed, the mixture is sprayed with a small quantity of shortening in a molten condition. All the flour is then added and mixed for a short time, then the baking powder, already coated as described, is introduced, and after a mixing period sufficient to thoroughly incorporate the ingredients, the balance of shortening fat is added. This fat is introduced into the mixture in the form of a spray of hot melted fat at the top of the mixing machine, the mixer revolving as the hot fat is applied, giving every part of the mixture an even coating of fat.

As a result of this process the various ingredients of the mixture, some of which are delicate and perishable, containing oily and other elements which easily become rancid, are coated or impregnated or otherwise combined with a material which itself is more resistant to rancidity than the perishable elements of the materials thus treated, and which protects the delicate constituents of these ingredients.

It has been noted in connection with the manufacture and use of this product that the various hard so-called high melting point fats and waxes which may be used for coating the baking powder ingredients, are in fact made up of different fatty glycerids and fatty acids which separately considered have different melting points, and that under ordinary circumstances the shortening fats or oils which are of still lower melting points, are apt to attack the lower melting point constituents of the coating material which is used to protect the baking powder, dissolving them, which results in the dissolution of the higher melting point fats, breaking down the coating of the baking powder constituents, exposing the baking powder to deterioration by interaction of its elements and causing the shortening fat to become rancid, or reducing its resistance to rancidity by interaction with the baking powder.

It has been discovered in connection with the development of the present method that this can be prevented, and in the practice of the applicant's process, it is prevented by mixing starch or other finely divided absorbent material with the hard fats. This is done when the fat is at a temperature between the melting points of its constituents. Under these circumstances the starch absorbs, secretes and segregates the low melting point fats, giving the whole material a higher and more uniform melting point, approximately that of the higher melting point constituents of the hard fat, and making it impossible for the shortening fat to attack the high melting point fats or greases used in coating baking powder, so that deterioration of the baking powder by action of the shortening fats, and other objectionable results just pointed out, are prevented.

The product in the preferred form is a baking mixture containing materials as flour, corn starch, sugar, shortening fat, powdered egg yolk, or albumen, powdered milk, baking powder, salt, coloring matter and flavoring, varied in accordance with the desired recipe, the perishable material with the exception of the baking powder constituents, being desiccated, coated and impregnated with the shortening fat to protect them from action by water and from rancidity from other causes, the baking powder constituents being coated with a relatively hard fat or wax which protects the baking powder from moisture and the action of the shortening fat, such coating material being of a higher melting point than the shortening, and preferably a fat having the more active constituents absorbed or segregated by means of a filler which may be starch or similar powdered material.

I have thus described specifically and in detail a method and product embodying my invention in order that its nature and the manner of practising the same may be clearly understood. However, the specific terms herein are used descriptively rather than in their limiting sense, the scope of the invention being defined in the claims:

1. A baking preparation containing the ingredients essential to the production of a cake or biscuit including flour, perishable ingredients and baking powder ingredients and a shortening which has a greater capacity for resisting rancidification than the said perishable ingredients and which is solid at normal summer temperatures, the perishable ingredients being protected by the shortening.

2. A baking preparation containing the ingredients essential to the production of a cake or biscuit, including baking powder ingredients and a water insoluble material, which comprises a shortening, the said ingredients being protected by and with said latter material which is solid at normal summer temperatures and has a greater capacity for resisting rancidification than said perishable ingredients and begins to melt a few degrees above such temperatures.

3. A baking preparation consisting of the essential materials for the production of a cake or biscuit, including flour, perishable ingredients and shortening material, the latter being solid at normal summer temperatures and having a greater capacity for resisting rancidification than have the said perishable ingredients, the perishable ingredients being protected by and with the shortening material and thereby preserved, the preparation also including baking powder ingredients and a coating material for the baking powder ingredients, with which they are coated and which is distinct from the shortening.

4. A baking preparation consisting of the essential materials for the production of a cake or biscuit, including flour, perishable ingredients and shortening material, the latter being solid at normal summer temperatures, the perishable ingredients being protected by and with the shortening material and thereby preserved, the preparation also including baking powder ingredients and a protecting material for the baking powder ingredients, and which is distinct from the shortening and of a higher melting point and practically insoluble therein.

5. A baking preparation which comprises starchy and lacteal elements and a shortening material which is solid at normal atmospheric summer temperatures and has a greater capacity for resisting rancidification than the lacteal element, the lacteal element being protected by and with the shortening and thereby segregated and preserved, the preparation also including baking powder ingredients.

6. A baking preparation in the nature of a prepared flour, containing in addition to flour, lacteal ingredients, egg material and a hydrogenated fat, the lacteal and egg material being protected by the fat, the preparation also including baking powder ingredients.

Signed by me at Baltimore, Maryland, this 20th day of August, 1919.

HARRY M. BLINN.

Witnesses:
PORTER H. FLAUTT,
ADELE MIELCKE.